Aug. 11, 1925.
L. JOHNSTON
1,549,363
SUSPENDING AND FEEDING DEVICE FOR TROLLEY WIRES
Filed July 5, 1923
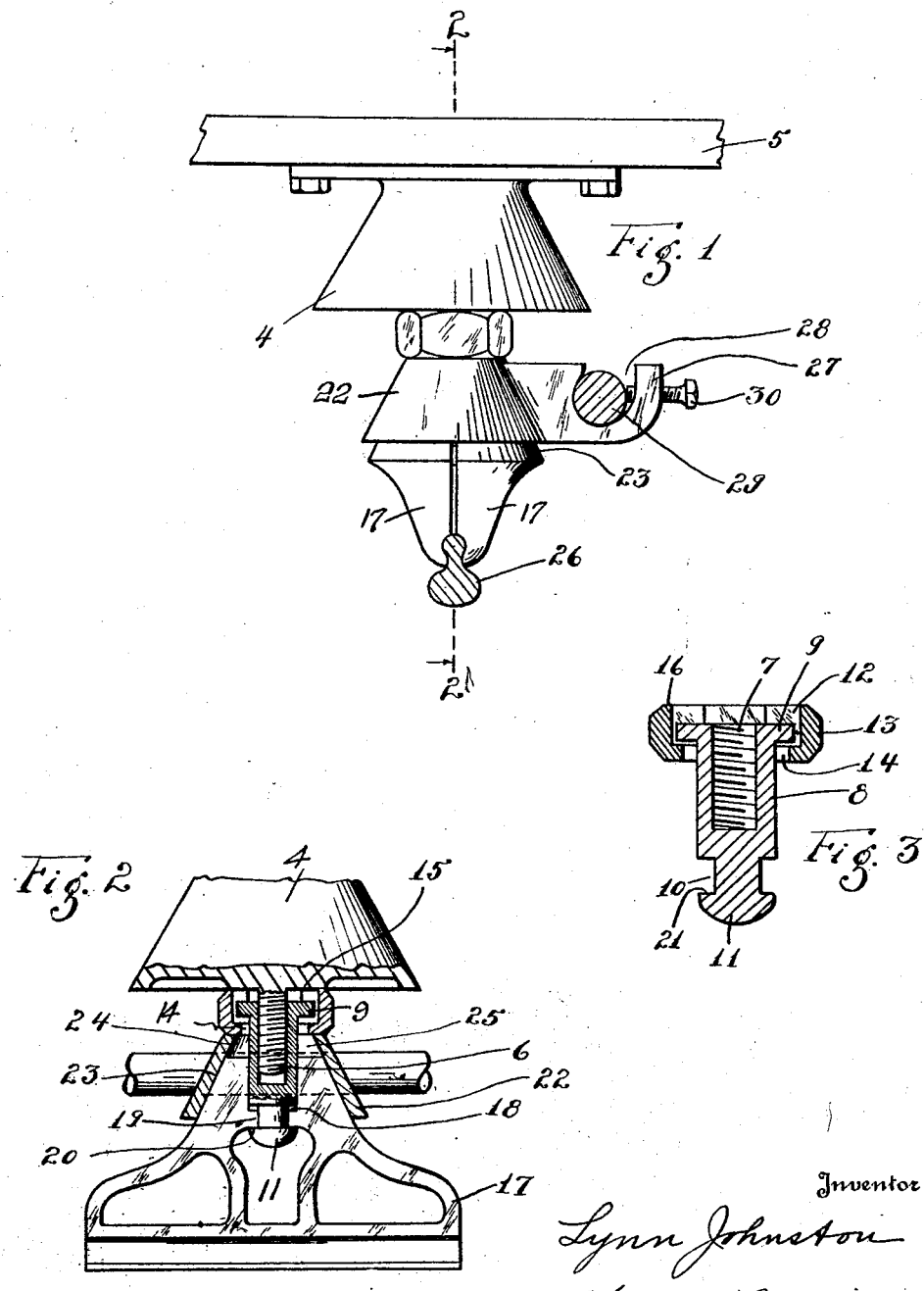
Inventor
Lynn Johnston
By Walter H. Murray
Attorney Patented Aug. 11, 1925.

1,549,363

UNITED STATES PATENT OFFICE.

LYNN JOHNSTON, OF CINCINNATI, OHIO, ASSIGNOR TO THE ELECTRIC RAILWAY EQUIPMENT COMPANY, OF CINCINNATI, OHIO, A CORPORATION OF OHIO.

SUSPENDING AND FEEDING DEVICE FOR TROLLEY WIRES.

Application filed July 5, 1923. Serial No. 649,509.

*To all whom it may concern:*

Be it known that I, LYNN JOHNSTON, a citizen of the United States of America, and a resident of Cincinnati, in the county of Hamilton and State of Ohio, have invented a new and useful Improvement in a Suspending and Feeding Device for Trolley Wires, of which the following is a specification.

An object of my invention is to provide a trolley wire and a feed wire support especially adapted for use in mines and the like, wherein a positive clamp is provided for both the feed wire and the trolley wire.

Another object of my invention is to provide a structure wherein breaking or snapping of either the feed wire or the trolley wire will not affect or interfere with said other conductor.

Another object is to provide a device wherein the conditions incident to breaking or snapping of said conductors will be localized to the space between two adjacent suspending devices and wherein re-threading of the conductors, because of such break, is eliminated.

Another object is to provide a simple and efficient device for the purposes stated.

These and other objects are attained by the means described herein and disclosed in the accompanying drawings, in which:

Fig. 1 is a front elevation of a device embodying my invention, showing conductors in section.

Fig. 2 is a sectional view on line 2—2 of Fig. 1.

Fig. 3 is an enlarged sectional view of a stem, forming a detail of my invention.

The hanger 4 suspended from support 5 carries a depending threaded stud 6. The stud 6 is adapted to engage in a threaded axial bore 7 in the stem 8. Stem 8 has formed at its upper end a head 9 preferably of an angular structure for example, hexagonal, and has formed in it, adjacent its lower end, an annular groove or recess 10, whereby there is provided at the lower end of the stem a knob 11. The head 9 of the stem is received within a recess 12 formed in the collar 13. The recess communicates with the reduced opening 14 thru a flange at the end of the collar and through which the reduced portion of the stem 8 extends. The recess 12 is preferably of an angular structure, similar to, but larger than the head 9, whereby the head 13 may be utilized to rotatably actuate the stem. The hanger 4 is provided with a downwardly exposed abutment face 15 upon which the upper edge 16 of the collar may engage. From the foregoing, it will be apparent that after the stud 6 is lodged in the bore 7 in the stem, the collar 13 may be rotatably actuated for both rotating the stem 8 and for drawing the collar into clamping engagement upon the face 15 of the hanger, whereby to rigidly position the stem in relation to the hanger and the support. A pair of suspending complementary ears 17 are mounted upon the lower end of the stem 8 and are provided with substantially semi-circular grooves 18 for the reception of the stem and also with a semi-circular ledge 19 adapted to enter the annular groove 10 in the stem. The lower faces 20 of each of the ledges 19 engage the lower walls 21 of the groove 10 and thereby provide lodgment of the ears upon the stem. A compression ring 22 is carried by the stem intermediate the collar 13 and the ears 17. The upper ends of the ears are developed into semi-conical surfaces 23 truncated at their upper end. The surfaces 23 of the pair of ears when mounted upon the stem 8 constitute a substantially truncated conical seat for annular engagement upon the tapered wall 24 of an aperture 25 extending axially thru the compression ring. The wall 24 of the aperture 25 converges upwardly, therefore, it will be apparent that as the ears are drawn into the aperture 25 the ears may be brought into clamping engagement upon the trolley wire 26. The compression ring 22 has formed on it a laterally extending lug 27 provided with a notch 28 for the reception of a feed wire 29. The lug 27 is provided with a threaded bore communicating with the notch 28 and in which is adjustably mounted a set screw 30. The set screw 30 may be employed for fixedly clamping or locking the conductor 29 in position upon the lug 27.

In mines, the feed wire 29 must be carried substantially to the limit of the trolley wire or conductor 26. Heretofore it has been practice to carry the feed wires along the side of the mine tunnel and at various intervals lead wires would connect the conductors 26 and 29. This type of wiring is unsatisfactory for a number of reasons. In devices embodying my invention the feed wire 29 may be carried by the same means that carries the conductor 26, thereby eliminating the lead wires previously referred to and providing a feed wire that will retain a fixed relationship to the carrying devices and the conductor 26. It should be noted that should there be a break in the conductor 29 between the adjacent hangers, there will be no sagging of the conductor 29 thruout other parts of the mine and that the only attention that such a condition will necessitate will be the mending of the break. The cooperation of the several elements for fixedly securing the conductor 29 is self-evident.

What I claim is:

1. In a device of the class described the combination of a stem having an annular groove at its lower end, and having a head at its upper end, a pair of ears each having a substantially circular seat for the reception of the stem and provided with lugs for entry into the groove in the stem, the ears having upwardly converging outer faces, a collar mounted upon the stem and containing the head, the collar having an inwardly extending flange lodged below the head on the stem for precluding separation of the stem and the collar in one direction, a compression ring spacing the collar and the ears for precluding separation of the stem and the collar in the opposite direction, the compression ring having an internal converging face for engagement upon the converging faces on the ears, the collar and head being arranged for joint rotatory movement, and means for utilizing the rotatory motion of the collar and stem for moving the stem longitudinally of the collar for fixedly mounting the stem and for moving the ears into the compression ring whereby to move the ears into a clamping relationship.

2. In a device of the class described the combination of a stem having an annular groove at its lower end and having a head at its upper end, a pair of ears each having a substantially circular seat for the reception of the stem and provided with lugs for entry into the groove in the stem, the ears, having upwardly converging outer faces, a collar mounted upon the stem and containing the head, the collar having an inwardly extending flange lodged below the head on the stem for precluding separation of the stem and the collar in one direction, a compression ring spacing the collar and the ears for precluding separation of the stem and the collar in the opposite direction, the compression ring having an internal converging face for engagement upon the converging faces on the ears, the collar and head being arranged for joint rotatory movement, means for utilizing the rotatory motion of the collar and stem for moving the stem longitudinally of the collar for fixedly mounting the stem and for moving the ears into the compression ring whereby to move the ears into a clamping relationship, and means for fixedly clamping a wire conductor upon the compression ring.

3. A suspending device for trolley wires, said device comprising a two-part holding ear, adapted to receive and clamp a trolley wire, a member mounted on and movable relatively to the ear for retaining the two parts of the latter together in their clamping position, a member rotatively mounted in the ear, and having means for the attachment of a hanger or support, and means carried by said device for supporting and fixedly clamping a feed wire for said trolley wire.

4. A suspending device for a trolley wire and a feed wire for said trolley wire comprising means for fixedly clamping the trolley wire, a rotatable member, a slotted lug extending from the rotatable member, the slot being adapted to receive a feed wire and means carried by the lug for fixedly clamping the feed wire upon the wall of the slot.

5. A suspending device for a trolley wire and a feed wire for said trolley wire comprising a rotatable member and means associated with said rotatable member for cooperation with said rotatable member in clamping said trolley wire, a lug extending from the rotatable member, the lug having a slot open at its upper end and adapted to receive a feed wire, and means carried by the lug for clamping upon the lug a feed wire contained within the slot.

6. A suspending device for a trolley wire and a feed wire for said trolley wire comprising means for fixedly clamping the trolley wire and an auxiliary means carried by said first means for fixedly clamping the feed wire independently of the trolley wire and for equalizing the voltages of the trolley wire and the feed wire.

In testimony whereof I have hereunto subscribed my name this 28th day of June, 1923.

LYNN JOHNSTON.